Figure 1:
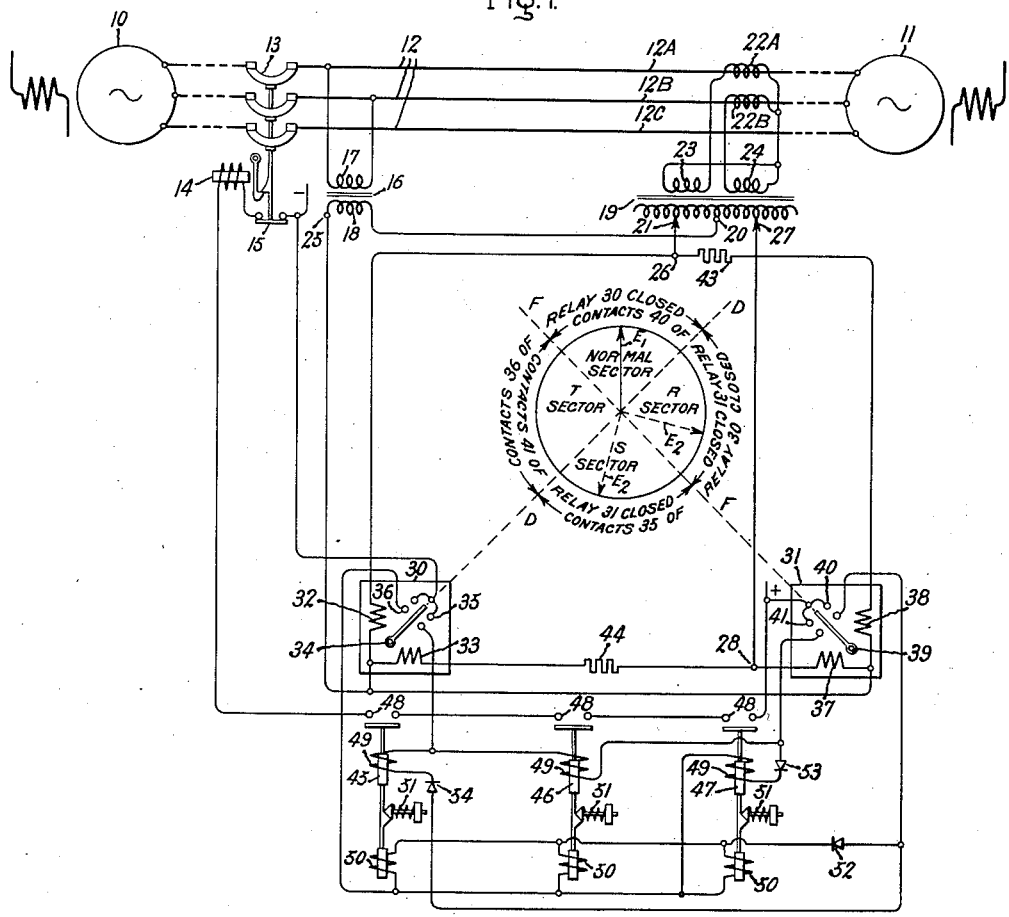

Inventors:
Oliver C. Traver,
Elbert H. Bancker,
by Harry E. Dunham
Their Attorney.

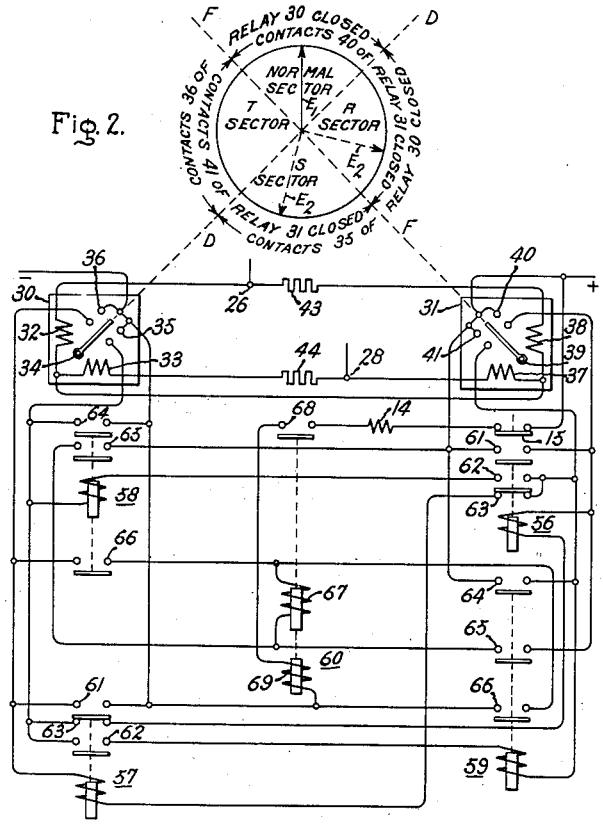
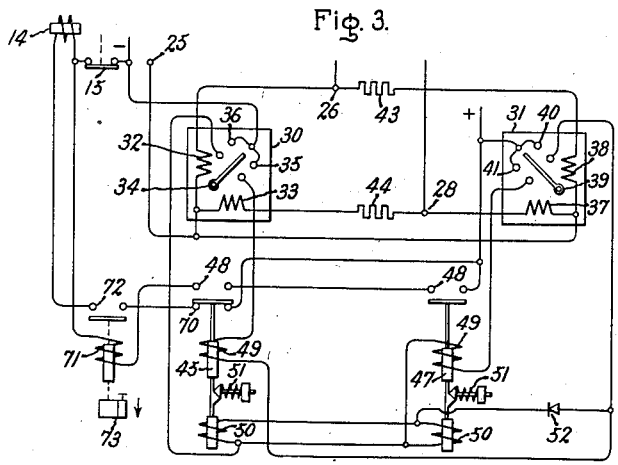

Patented Oct. 10, 1944

2,360,176

UNITED STATES PATENT OFFICE 2,360,176

SUPERVISION OF ELECTRIC SYSTEMS

Oliver C. Traver, Drexel Hill, Pa., and Elbert H. Bancker, Schenectady, N. Y., assignors to General Electric Company, a corporation of New York Application October 9, 1942, Serial No. 461,490

18 Claims. (Cl. 175—294)

Our invention relates to improvements in the supervision of alternating-current electric systems and more particularly to an out-of-step protective system.

Faults on an alternating-current electric system have been known to cause synchronous machinery to fall out of step and thereby to produce such fluctuating voltage and current conditions in sound portions of the system as to cause false operation of the fault-responsive protective relays and circuit breakers controlled thereby on the sound portion. Obviously, such false operation must be avoided because loads are likely to be left without any source of power. In United States Letters Patent 2,095,117, granted October 5, 1937, and assigned to the same assignee as the present application, there is disclosed and claimed a protective system which, on the occurrence of out-of-step conditions, subdivides the system in such a way as to eliminate the out-of-step condition while, at the same time, permitting an adequate source of power for every subdivision. The points of subdivision in the system are so chosen at which the normal exchange of power is small or such that the connected generating capacity in any subdivided part is sufficient to carry the load of that part. The arrangement disclosed and claimed in the above-mentioned patent, in order to distinguish between an asynchronous condition and a three-phase fault condition, requires three power reversals before tripping of the subdividing circuit breakers can occur.

It would be desirable to provide an out-of-step protective system in which an out-of-step condition is detected earlier during the out-of-step condition without requiring three power reversals as is the case in connection with the above-mentioned patent. In the U. S. Letters Patent 2,303,133, granted November 24, 1942, on copending application of John H. Neher, Serial No. 401-161, filed July 5, 1941, and assigned to the same assignee as the present application, there is disclosed and claimed an out-of-step protective scheme in which an out-of-step condition is detected on the first pole slip without waiting for three power reversals as in the prior art constructions. However, in the Neher disclosure, this condition can be detected on the first pole slip only when a particular system set-up exists and, more specifically when the reactance center of the system falls within a dynamoelectric machine associated with the system.

It is an object of our invention to provide a new and improved out-of-step protective system which operates the protective means earlier during the out-of-step condition than was heretofore possible without any limitations on the system set-up.

It is another object of our invention to provide a new and improved protective system for quickly terminating an out-of-step condition in order to avoid the troubles associated with instability.

Still another object of our invention is to provide a new and improved out-of-step protective system which causes operation of the out-of-step protective means or blocks operation of the protective means during an out-of-step condition.

It is a further object of our invention to provide a new and improved out-of-step protective scheme which operates the protective means at a preferred instant during the cycle of the alternating current.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawings in which Fig. 1 illustrates diagrammatically an embodiment of our invention as applied to a polyphase alternating current electric system including a vector diagram associated therewith to aid in understanding the operation thereof; Fig. 2 is a diagrammatic representation of the control circuit of a modification of the protective system of Fig. 1 including an associated vector diagram to aid in understanding the invention; and Fig. 3 represents a portion of the protective system of Fig. 1 to illustrate a modification of our invention.

Referring now to Fig. 1, we have illustrated our invention as embodying a polyphase alternating current electric system shown schematically and simply as comprising two synchronous dynamoelectric machines 10 and 11 interconnected by a polyphase tie line or interconnection 12 comprising phase conductors 12A, 12B, and 12C. The balance of the system network and apparatus, such as feeders, transformers, and other devices, has been omitted for the sake of simplicity in illustration.

It will be understood by those skilled in the art that out-of-step protective arrangements are used for two different purposes. Sometimes they are used to subdivide a system as was referred to above on the occurrence of an out-of-step condition. At other times they are used to block the operation of associated protective apparatus on the occurrence of an out-of-step condition because such associated apparatus might falsely isolate a section of the system due to the fact that an out-of-step condition appears like a fault condition to such associated protective apparatus. Although our invention, as will become apparent from the following description, may be used for either purpose, namely, to cause subdivision of the system at a preferred point, on the occurrence of an out-of-step condition or to prevent operation of associated protective apparatus at some undesirable point, on the occurrence of an out-of-step condition, we have chosen to illustrate our invention as applied to arrangements in which the subdivision of a system in response to an out-of-step condition is accomplished.

Accordingly, for subdividing the system, we provide circuit interrupting means 13, specifically disclosed as a latched-closed circuit breaker, which is provided with a trip coil 14 and an "a" switch 15 which is closed when the circuit breaker is closed and open when the circuit breaker is open. Circuit interrupting device 13 should be so located with respect to the schematically illustrated system comprising synchronous machines 10 and 11 and tie line 12 that an adequate source of power for each subdivision is provided and that the normal exchange of power through circuit breaker 13 is relatively small.

It will be understood by those skilled in the art that a comparison of the angular position of the voltage vectors of the lumped generating sources 10 and 11 of Fig. 1 will give a positive and immediate indication of the stability of the system. For example, if the line-to-line voltage of the generator 10 is represented by the vector $E_1$ and the line-to-line voltage of the generator 11 is represented by the vector $E_2$, there will be no power transfer between the two generating sources when the vectors $E_1$ and $E_2$ are in phase. When the vectors $E_1$ and $E_2$ are not in phase, then there will be a power transfer from the generating source whose voltage vector leads with reference to the voltage vector of the other generating source. The maximum power transfer between the generating sources will occur when the voltage vectors $E_1$ and $E_2$ are displaced from one another by ninety degrees, at which point the maximum synchronizing force will also obtain. When the voltage vectors become 180 degrees out of phase, a maximum interchange of current between the generating sources will occur but there will be no interchange of real power and no synchronizing force will be available.

Consequently, the angular relationship between the voltage vectors of the generating sources 10 and 11 may be advantageously used to determine whether an out-of-step condition exists on the system. These voltages or voltage vectors have a frequency difference equal to the slip frequency of the system so that a comparison of their angular positions may readily be made. However, since generating sources 10 and 11 may be widely separated, it is usually not very practical to measure the voltages thereof and compare them at some intermediate point where it is desired to subdivide the system. In accordance with our invention, the circuit breaker 13 is placed at an intermediate point between generating sources 10 and 11 and it is desirable that the relaying quantities be obtained adjacent thereto for controlling the operation of circuit breaker 13. If the line-to-line or delta voltage is measured at this intermediate point on the system and there is added thereto a voltage drop obtained by the circuit current flowing through a reactance equal to the reactance of the system between one of the sources and the relaying point, a voltage quantity will be obtained which is proportional in phase and amount to the generated voltage at that source. Correspondingly, if the delta voltage is modified by subtracting therefrom the reactance voltage drop between the relaying point and the other generating source, a voltage quantity proportional in magnitude and phase position with the voltage of the other generating source will be obtained and a comparison of the angular position of these two voltage vectors will give an indication of system stability or, in other words, will indicate whether or not an out-of-step condition exists on the system.

Accordingly, in Fig. 1 we have illustrated a potential transformer 16 having a primary winding 17 connected across phase conductors 12A and 12B and a secondary winding 18, the voltage across which is proportional to $E_R$, the line-to-line or delta voltage at the relaying point. In order to obtain a voltage proportional to $E_1$, the voltage at the generating source 10, we provide a compensating reactor 19 having a fixed terminal 20 and an adjustable terminal 21. The potential between terminals 20 and 21 is proportional to the reactance drop of the system between hte relaying point, namely, where transformer 16 is connected across tie line 12 up to and including generating source 10. If a current proportional to the so-called "delta" current in the line 12 is caused to flow through compensating reactor 19, a potential proportional to the drop between the relaying source and the generating point will be obtained. This so-called "delta" current, as will be obvious to those skilled in the art, may be obtained by taking the difference between two line currents which is accomplished, as is illustrated in Fig. 1, by providing two separate current transformers 22A and 22B associated with phase conductors 12A and 12B, respectively. The secondary winding of current transformer 22A is connected across a winding 23 on compensating reactor 19 while the secondary winding of current transformer 22B is connected across the winding 24 on compensating reactor 19 in such a manner that the fluxes produced in the core of compensating reactor 19 by the current flowing in windings 23 and 24 are subtractive and produce a resultant flux proportional to the delta current flowing in the line 12. Variable terminal 21 of compensating reactor 19 is adjusted in accordance with the reactance of the system from and including source 10 to the relaying point at which the subdivision of the system should occur on out-of-step conditions so that the potential obtained across terminals 20 and 21 is proportional to the voltage drop between the relaying point and generating source 10. By adding this potential to the potential $E_R$ obtained across the secondary winding 18 of potential transformer 16, a potential proportional to the potential $E_1$ at generating source 10 both in magnitude and phase position is obtained across terminals 25 and 26.

Similarly, compensating reactance 19 is provided with a second adjustable terminal 27 so that the voltage between terminal 27 and terminal 20 may be adjusted in accordance with the reactance of the system between the relaying point to and including generating source 11. With this arrangement, a potential is obtained across terminals 20 and 27 proportional to the line drop between the relaying point to and including generating source 11. The portion of compensating reactor 19 between terminals 20 and 27 is connected in series with the secondary winding 18 of potential transformer 16, so that the line drop is subtracted from the voltage $E_R$ and a potential appears across the terminals 25 and 27 or terminals 25 and 28 proportional to the generated voltage $E_2$ of generating source 11. Since the resistance drop of the system is small relative to the reactance drop, the error in angular relationship between $E_1$ and $E_2$ when neglecting resistance drops is negligible.

In order to compare the angular position of the voltages $E_1$ and $E_2$ obtained across terminals 25 and 26 and 25 and 28, respectively, we provide a plurality of voltage directional relays 30 and 31 which are of the product type. The relay 30 is provided with a pair of windings 32 and 33 and a movable switching member 34 controlled thereby adapted to close, when in one extreme position, the contacts 35 and, when in the other extreme position, the contacts 36. One of each of the contacts 35 and 36 is connected to one terminal of a source of control potential, as shown in Fig. 1. Similarly, the relay 31 is provided with a pair of windings 37 and 38 and a switching member 39 controlled thereby. The switching member 39 is adapted to close contacts 40 when in one extreme position and to close contacts 41 when in the other extreme position. The winding 32 of electroresponsive device 30 and the winding 38 of electroresponsive device 31 are energized with a potential $E_1$ appearing across terminals 25 and 26 while the winding 33 of electroresponsive device 30 and the winding 37 of electroresponsive device 31 are energized with the potential $E_2$ obtained across the terminals 25 and 28. A suitable phase-shifting impedance such as resistor 43 is connected in series with the winding 38 whereby the position of zero torque of switching member 39 is shifted to a particular position, such as the position F—F shown in the vector diagram associated with Fig. 1. Similarly, the resistor 44 is connected in series with the winding 33 of electroresponsive device 30 for phase-shifting purposes so that the position of zero torque of switching member 34 occurs on the axis DD or, in other words, the zero torque positions of electroresponsive devices 30 and 31 are displaced in phase by some predetermined angle which by way of example in the drawings has been shown as ninety degrees.

With the arrangement described thus far and with reference to the vector diagram associated with Fig. 1, it will be observed that the zero torque axes DD and FF produce a plurality of sectors which in the specific illustration are actually four quadrants which have been respectively designated as the Normal sector, the R sector, the S sector, and the T sector. It will be obvious to those skilled in the art that the voltage vectors $E_1$ and $E_2$ will both swing with respect to some other reference, during an asynchronous condition on the alternating current system but, if the vector $E_1$ is chosen as a reference as indicated in the vector diagram associated with Fig. 1, then it is only necessary to consider the movement of the voltage vector $E_2$ with reference to the vector $E_1$. Consequently, if the angular position of the voltage vector $E_2$ is displaced from the voltage vector $E_1$ by less than 180 degrees, an out-of-step condition on the system may not exist but, if the displacement between the vectors is 180 degrees or more, then an out-of-step condition does exist. Consequently, if the voltage vector $E_2$ rotates in a clockwise direction with reference to the vector $E_1$ shown in Fig. 1 from its in-phase position with the vector $E_1$ through sector R and sector S into sector T, it would be desirable to subdivide the system. Similarly, if the power transfer were in the other direction and the vector $E_2$ rotated in a counterclockwise direction from its in-phase position with the voltage vector $E_1$ through sectors T and S in succession and into sector R, then, again, it would be desirable to subdivide the system since an out-of-step condition is indicated. If, however, the vectors $E_1$ and $E_2$ swing apart and then come back together again without going through S and into the T or the R sector, depending upon the clockwise or the counterclockwise rotation of the vector $E_2$ with reference to the vector $E_1$, an out-of-step condition is not indicated and it would be undesirable for a subdivision of the system to take place.

In order to control circuit interrupting device 13 in response to an out-of-step condition as determined by the operation of electroresponsive devices 30 and 31, we provide a control or trip-conditioning apparatus comprising a plurality of trip-conditioning relays or electroresponsive devices which are preferably of substantially identical construction illustrated generally at 45, 46, and 47, respectively. Each of these relays comprises a pair of normally open contacts 48 which are serially arranged with trip coil 14 and "a" switch 15 across a source of control potential so that, when all three sets of contacts 48 are closed, opening of circuit interrupting device 13 will take place. Each of the trip conditioning relays 45, 46, and 47 is illustrated as having a closing winding 49 and an opening winding 50, which windings are preferably placed on separate cores as indicated. Whenever the winding 49 of any of the electroresponsive devices 45, 46, or 47 is energized, the corresponding contact 48 of that relay or electroresponsive device will be closed and, furthermore, will remain closed because of a spring and cam arrangement generally indicated at 51 associated with each electroresponsive device which operates as a so-called "stay-put" device, that is, the relay will stay in the position it assumes by virtue of the last energization of its windings 49 or 50. If the winding 49 was energized last, the contacts of the relay 48 will be closed and remain so regardless of the deenergization of the winding 49 until the opening winding 50 has been energized whereupon the contacts 48 are opened.

Opening windings 50 are all connected in parallel and are energized whenever the contacts 36 of electroresponsive device 30 and the contacts 40 of electroresponsive device 31 are both closed at the same time which, as is obvious from the vector diagram associated with Fig. 1, can occur only when the voltage vector $E_2$ is in the normal sector. The winding 49 of electroresponsive device 47 is energized whenever the contacts 41 of electroresponsive device 31 and the contacts 36 of electroresponsive 30 are both closed at the same time. By reference to the vector diagram associated with Fig. 1, this can occur only when the vector $E_2$ has passed into the T sector. Similarly, the winding 49 of electroresponsive device 46 is connected so as to be energized only when the contacts 41 of electroresponsive device 31 and the contacts 35 of electroresponsive device 30 are closed which, by reference to the vector diagram associated with Fig. 1, occurs when the vector E2 passes into the S sector or quadrant. Also the winding 49 of electroresponsive device 45 can be energized only when the contacts 35 of electroresponsive device 30 and the contacts 40 of electroresponsive device 31 are both closed at the same time. Since the contacts 48 of all three of the relays 45, 46, and 47 must be closed before tripping of circuit interrupting device 13 can obtain, it is necessary for the voltage of generating source 11 to swing from the normal sector through the R and S into the T sector or from the normal sector through the T and S sectors into the R sector before subdivision of the system will take place. If the swing does not progress that far and the vector returns to the normal sector, resetting of all of the relays 45, 46, and 47 by virtue of energization of the windings 50 will take place. In order to be sure that no stray control currents may flow in circuits where they are not desired, we have provided unilaterally conducting devices 52, 53, and 54, which prevent any undesirable energization of the windings 49 and 50.

The operation of the out-of-step protective system of Fig. 1 will be obvious in view of the detailed description included above and particularly with reference to the vector diagram included with Fig. 1. By means of the potential transformer 16 and the compensating reactor 19, the electroresponsive devices 30 and 31 compare the generated voltages at generating sources 10 and 11, respectively, and dependent upon the angular position of the voltage vectors representing the voltages at these sources control of the trip-conditioning apparatus is obtained and subdivision of the system by operation of circuit-interrupting device 13 is accomplished on out-of-step conditions with the first pole slip of one of the synchronous machines with reference to the other as contrasted with prior art arrangements where three pole slips were required before subdivision of the system could be accomplished. Furthermore, it is immaterial as to where the electrical center of the system is positioned in so far as the proper operation of my protective system is concerned.

Although the system has been schematically illustrated in Fig. 1 and although as a practical matter system changes will occur during the operation of the system, nevertheless, such system changes will have a very small effect on the output of compensating reactor 19 so that satisfactory operation on substantially all systems is assured.

Instead of using relays or electroresponsive devices of special design including the stay-put devices 51, it might be desirable to use ordinary relays and, accordingly, in Fig. 2 we have illustrated a modification of the arrangement disclosed in Fig. 1 in which only the relays 30 and 31 and the control circuits are illustrated and in which the corresponding parts thereof are designated by the same reference numerals as in Fig. 1. A vector diagram similar to that disclosed in Fig. 1 is also associated with Fig. 2. It should be understood that the relays 30 and 31 are connected in identically the same manner and operated in the same manner as in Fig. 1. In Fig. 2, the trip-conditioning apparatus includes a plurality of relays or electroresponsive devices generally indicated at 56, 57, 58, 59, and 60, respectively. The trip conditioning relays 56 and 57 are each provided with two sets of normally open contacts, generally designated at 61 and 62, respectively, and a set of normally closed contacts 63. The contacts 61 of relays 56 and 57 are seal-in contacts while the contacts 62 and 63 are interlocking contacts, the normally closed interlocking contacts 63 serving to interlock trip-conditioning relays 56 and 57 against both being operated at any one time. The normally open interlocking contacts 62 of relay 57 interlock relay 57 with auxiliary trip-conditioning relay 59 while the normally open interlocking contacts 62 of trip-conditioning relay 56 interlock relay 56 with auxiliary trip-conditioning relay 58. These interlocking contacts 62 are so arranged that auxiliary trip-conditioning relay 58 or 59 cannot be energized unless the corresponding trip-conditioning relay 56 or 57 is first energized.

The auxiliary trip-conditioning relay 58 or 59 which may only be energized if the corresponding relay 56 or 57 has first been energized, each comprises three sets of normally open contacts 64, 65, and 66, the contacts 64 acting as seal-in contacts. The contacts 65 and 66 are so arranged that, upon energization of relay 58, for example, which of course necessitates the prior energization of relay 56, completes the energization circuit for the operating winding 67 of relay 60 through contacts 36 of relay 30 as soon as the voltage vector E2 enters the T sector after having passed through sectors R and S. Similarly, the contacts 65 and 66 of auxiliary trip-conditioning relay 59 which are closed upon energization thereof after prior energization of trip-conditioning relay 57 and in conjunction with contacts 40 of relay 31 complete the energization of operating winding 67 of tripping relay 60 which controls the contacts 68 connected in series with the trip coil 14 and "a" switch 15 when the voltage vector E2 passes through sectors T and S and into R. If desired, a suitable seal-in winding 69 may be provided for tripping relay 60 to maintain the contacts 68 closed once the relay 60 has picked up until the tripping operation of circuit interrupting device 13 has been completed.

The operation of the protective system of Fig. 2 will be obvious from the detailed description given above. Whenever the voltage vector E2 enters the R sector, the contacts 40 and 35 of electroresponsive devices 31 and 30, respectively, will be closed, thereby completing the energization circuit of trip-conditioning relay 56 through the normally closed interlocking contacts 63 of trip-conditioning relay 57. When the voltage vector E2 subsequently enters the S sector, the contacts 41 of electroresponsive device 31 will close and the contacts 35 of electroresponsive device 30 will remain in the closed position, thereby completing the energization circuit for auxiliary trip-conditioning relay 58 through the contacts 62 of trip-conditioning relay 56 which has been sealed in by virtue of seal-in contacts 61. The closure of the contacts 64 of auxiliary trip-conditioning relay 58 will cause relay 58 to seal in. As soon as the voltage vector enters the T sector to close the contacts 36 of electroresponsive device 30, the energization circuit for the winding 67 of tripping relay 60 is completed through contacts 65 and 66 of auxiliary trip-conditioning relay 58, whereupon the trip coil 14 of circuit breaker 13 is energized and subdivision of the circuit will occur due to the positive indication of an out-of-step condition.

If the voltage vector E2 should move away from the voltage vector E1 in a counterclockwise direction by way of the T and S sectors into the R sector, then the same process will occur except that trip-conditioning relay 57 will be energized when the vector E₂ enters the T sector. Thereafter, the auxiliary trip-conditioning relay 59 will be energized when the voltage sector E₂ enters the S sector and tripping relay 60 will be energized to close its contacts 68 and cause operation of circuit-interrupting device 13 as soon as the voltage vector E₂ enters the R sector. Any time that the voltage vector E₂ enters the normal sector, the trip-conditioning and auxiliary trip-conditioning relays will become deenergized and assume their normal positions.

It will be understood by those skilled in the art that the protective system of Fig. 1 may be simplified by eliminating the trip-conditioning relay 46 if it is assumed that the voltage vector E₂ can proceed from the R to the T quadrant or vice versa only through the S sector and, in Fig. 3 we have shown a portion of the protective system of Fig. 1 designated by the corresponding reference numerals used in Fig. 1 in which the trip-conditioning relay 46 has been eliminated. In this case it is unnecessary to provide the unilaterally conducting devices 53 and 54 which have been omitted from Fig. 3.

When a circuit breaker is opened in a circuit connecting two parts of a system which are out of step, that is, which have a large relative angular displacement with respect to each other, the fundamental and transient frequency recovery voltages may have magnitudes which are higher than that obtained for any other type of switching operation. Numerous cases are known in which actual switch failure occurred due to its inability to clear the circuit under such conditions and there are many cases in which the re-striking of the arc in the circuit breaker has been particularly severe. This is due to the fact that when a circuit breaker attempts to interrupt the circuit interconnecting two parts of a system which are 180 degrees out of phase, the fundamental frequency recovery voltages obtain a value equal to approximately twice the normal line-to-neutral voltage across each of the phase conductors of the switch. The transient voltages may be even greater approaching as much as four times normal and possibly six or seven times normal if there is restriking. It would be desirable, therefore, to provide an out-of-step protective scheme in which the switching severity under out-of-step conditions may be greatly reduced by permitting such switching only at points in the swing which will not result in such abnormal voltages across the circuit breaker contacts. This becomes particularly desirable in connection with modern high speed circuit breakers wherein the arcing time in the circuit breaker is relatively small compared to the time required for the usual out-of-step oscillation between two parts of a system.

In the U. S. Letters Patent 2,310,065, granted February 2, 1943, on copending application of Seldon B. Crary, Serial No. 396,436, filed June 3, 1941, and assigned to the same assignee as the present application, there is disclosed and claimed an out-of-step protective arrangement in which auxiliary means are provided which prevent switching under out-of-step conditons at those points in the swing where abnormally high voltages would exist across the switching means. With the out-of-step protective system of our invention, auxiliary means for distinguishing the points in the swing when tripping is permitted are not required and the out-of-step protective apparatus itself is readily capable of picking out the points during the swing cycle when tripping of the circuit interrupting means 13 should be permitted. As was mentioned above, whenever the voltage vector E₂ is in the normal quadrant, it is 45 degrees or less out of phase with the voltage vector E₁ and, consequently, the current interchange between generating sources 10 and 11 is small. If subdivision of the system should occur on an out-of-step condition only after the voltage vector E₂ reached the normal quadrant, operation of circuit interrupting means 13 to subdivide the system at an instant when the switching severity is low would be assured.

Accordingly, in Fig. 3 we have also modified trip-conditioning relay 45 by providing a set of normally closed contacts 70 in addition to the normally open contacts 48. Also, we have provided a tripping electroresponsive device 71 for controlling normally open contacts 72 connected in series with a trip coil 14. Preferably, tripping electroresponsive device 71 picks up instantaneously and drops out with a time delay which insures sufficient time for opening of circuit breaker 13 as well as for another purpose to be described hereinafter. Any suitable time delay scheme may be provided for relay 71 which has been schematically illustrated at 73.

In order that tripping of circuit interrupting means 13 cannot occur until an out-of-step condition has progressed sufficiently so that the voltage vector E₂ has again reached the normal quadrant, we connect the contacts 70 of trip-conditioning relay 45 in series with the contacts 72 of tripping relay 71. Tripping relay 71 is energized when the trip-conditioning relays 45 and 47 have closed their contacts 48 to indicate an out-of-step condition. It should be understood that a trip-conditioning relay 46, such as shown in Fig. 1, may also be provided to insure that the voltage vector E₂ passes through the quadrant S in going from the quadrant R to the quadrant T or vice versa even though trip-conditioning relays 45 and 47 have closed their contacts 48 to indicate an out-of-step condition thereby causing energization of tripping relay 71. Tripping of circuit interrupting device 13 cannot occur before the voltage vector E₂ again enters the normal quadrant, whereupon the winding 50 of trip-conditioning relay 45 is energized causing it to close contacts 70 at which time the subdivision of the alternating current system may take place without requiring circuit interrupting means 13 to interrupt high currents. It will be understood that the contacts 70 could equally well be provided on trip-conditioning relay 47 instead of on trip-conditioning relay 45. The time delay means 73 on tripping electroresponsive device 71 will maintain contacts 72 closed for a sufficiently long period of time to enable the voltage vector E₂ to reach the normal quadrant whereupon the contacts 70 will be closed and tripping initiated. The time delay produced by the means 73 of tripping electroresponsive device 71 may be very short provided a seal-in winding, such as the winding 69 of tripping electroresponsive device 60 of Fig. 2, is added to device 71.

The operation of the arrangement disclosed in Fig. 3 will be obvious to those skilled in the art in view of the detailed description included above.

While we have shown particular embodiments of our invention as applied to electric protective systems, it will be apparent to those skilled in the art that our invention is not limited to the particular arrangements shown but that changes and modifications may be made without departing from the spirit and scope of our invention, and we aim in the appended claims to cover all such changes and modifications.

What we claim as new and desire to secure by Letters Patent of the United States is:

1. In an out-of-step responsive arrangement for an electric system subject to asynchronous or out-of-step conditions thereon which may be represented by an equivalent system including a lumped generating source at each end thereof, the combination of means for obtaining at a predetermined point on said system a plurality of instantaneous voltage quantities having substantially the phase relationship of the generated voltages of said two lumped generating sources, and means responsive to the angular relationship between said voltage quantities for producing a control impulse when said angular relationship is so great as to indicate an out-of-step condition on said system.

2. In an out-of-step responsive arrangement for an electric system subject to asynchronous or out-of-step conditions thereon which may be represented by an equivalent system including a lumped generating source at each end thereof, the combination of means including compensating means for obtaining at an intermediate predetermined point on said system a plurality of instantaneous voltage quantities having substantially the phase relationship of the generated voltages of said two lumped generating sources, and means responsive to the angular relationship between said voltage quantities for producing a control impulse when said angular relationship is so great as to indicate an out-of-step condition on said system.

3. In an out-of-step responsive arrangement for an electric system subject to asynchronous or out-of-step conditions thereon which may be represented by an equivalent system including a lumped generating source at each end thereof, the combination of means including a compensating reactor for obtaining at an intermediate point on said system a plurality of instantaneous voltage quantities having substantially the phase relationship of the generated voltages of said two lumped generating sources, and means responsive to the angular relationship between said voltage quantities for producing a control impulse when said angular relationship is so great as to indicate an out-of-step condition on said system.

4. In an out-of-step responsive arrangement for an electric system subject to asynchronous or out-of-step conditions thereon which may be represented by an equivalent system including a lumped generating source at each end thereof, the combination of means for vectorially adding to the potential at a predetermined intermediate point on said system a potential proportional to the potential drop from one of said sources to said point so that a resulting potential having substantially the same phase position as the generated potential of said one source is obtained, means for vectorially adding to the potential of said predetermined intermediate point on said system a potential proportional to the potential drop from the other of said sources to said point so that a resulting potential having substantially the same phase position as the generated potential of said other source is obtained, and means responsive to the angular relationship of said resulting potentials for producing a control impulse when said angular relationship is so great as to indicate an out-of-step condition on said system.

5. In an out-of-step responsive means for an electric tie-line of a synchronous alternating current transmission system which system comprises a plurality of generating stations having synchronous machines at opposite ends of said tie-line and means for interrupting the circuit of said tie-line, the combination of means for comparing the angular relationship of a plurality of electrical quantities having substantially the same instantaneous angular relationship as the generated voltages of said synchronous machines, and means for causing operation of said means for interrupting the circuit of said tie-line upon the first pole slip of one of said synchronous machines relative to the other when the angular relationship of said quantities is such as to indicate an out-of-step condition on said system.

6. In an out-of-step responsive means for an electric tie-line of a synchronous alternating current transmission system which system comprises a plurality of generating stations having synchronous machines at opposite ends of said tie-line and means for interrupting the circuit of said tie-line, the combination of a pair of electroresponsive devices for comparing the angular relationship of a plurality of electrical quantities having substantially the same instantaneous angular relationship as the generated voltages of said synchronous machines, and means for causing operation of said means for interrupting the circuit of said tie-line upon the first pole slip of one of said synchronous machines relative to the other when the angular relationship of said quantities is such as to indicate an out-of-step condition on said system.

7. In an out-of-step responsive means for an electric tie-line of a synchronous alternating current transmission system which system comprises a plurality of generating stations having synchronous machines at opposite ends of said tie-line and means for interrupting the circuit of said tie-line, the combination of a pair of electroresponsive devices for comparing the angular relationship of a plurality of electrical quantities having substantially the same instantaneous angular relationship as the generated voltages of said synchronous machines, and trip controlling apparatus for causing operation of said means for interrupting the circuit of said tie-line upon the first pole slip of one of said synchronous machines relative to the other when the angular relationship of said quantities is such as to indicate an out-of-step condition on said system.

8. In an out-of-synchronism responsive means for an electric tie-line of a synchronous alternating transmission system, a pair of electroresponsive devices each responsive to a voltage quantity of said system and each having two circuit-controlling positions so as to provide more than two combinations of operating positions of said devices, and a control conditioning apparatus responsive to a predetermined sequence of different combinations of operating positions of said devices for distinguishing an out-of-step condition on said system.

9. In an out-of-synchronism responsive means for an electric tie-line of a synchronous alternating transmission system, a pair of electroresponsive devices each responsive to a voltage quantity of said system and each having two circuit-controlling positions so as to provide more than two combinations of operating positions of said devices, and a control conditioning apparatus responsive to a predetermined sequence of different combinations of operating positions of said devices and including more than two of such combinations to effect a control operation.

10. In an out-of-synchronism responsive means for an electric tie-line of a synchronous alternating current transmission system, a pair of electroresponsive devices each responsive to a voltage quantity of said system and each having two circuit-controlling positions so as to provide more than two combinations of operating positions of said devices, a control conditioning apparatus comprising a first relay responsive to a predetermined combination of operating positions of said devices, a second relay responsive to a different predetermined combination of operating positions of said devices, and means responsive to successive energization of both said first and second relays to effect a control operation.

11. In an out-of-step responsive means for an electric tie-line of a synchronous alternating current transmission system which system comprises a plurality of generating stations having synchronous machines at opposite ends of said tie-line and circuit interrupting means connected in said tie-line, the combination of a pair of electroresponsive devices each responsive to a voltage quantity of said system and having two circuit-controlling positions so as to provide more than two combinations of operating positions of said devices, a control conditioning apparatus comprising a first relay responsive to a predetermined combination of operating positions of said devices, a second relay responsive to a different predetermined combination of operating positions of said devices, and means responsive to the successive energization of said first and second relays to cause operation of said circuit interrupting means upon the first pole slip of one of said synchronous machines relative to the other.

12. In an out-of-step responsive means for an electric tie-line of a synchronous alternating current transmission system which system comprises a plurality of generating stations having synchronous machines at opposite ends of said tie-line and circuit interrupting means connected in said tie-line, the combination of a pair of electroresponsive devices each responsive to a voltage quantity of said system and each having two circuit controlling positions so as to provide more than two combinations of operating positions of said devices, a control conditioning apparatus comprising a first relay responsive to a predetermined combination of operating positions of said devices, a second relay responsive to a different predetermined combination of operating positions of said devices, and means responsive to the successive energization of said first and second relays to cause operation of said circuit interrupting means upon the first pole slip of one of said synchronous machines relative to the other, said last mentioned means being arranged to prevent the operation of said circuit interrupting means unless a predetermined minimum angular relationship between said voltage quantities of said system obtains.

13. In a control arrangement for use with an electric system subject to a synchronous or out-of-step conditions thereon which may be represented by an equivalent system including a lumped generating source at each end thereof, the combination of means for obtaining at a predetermined point on said system a plurality of instantaneous voltage quantities having substantially the phase relationship of the generated voltages of said two lumped generating sources, a pair of electroresponsive devices each responsive to one of said instantaneous voltage quantities and each having two circuit controlling positions so as to provide more than two combinations of operating positions of said devices, and a control conditioning apparatus responsive to a predetermined sequence of different combinations of operating positions of said devices.

14. In a control arrangement for use with an electric system subject to asynchronous or out-of-step conditions thereon which may be represented by an equivalent system including a lumped generating source at such end thereof and having circuit interrupting means for subdividing said system at a predetermined point thereon, the combination of means for obtaining at said predetermined point a plurality of instantaneous voltage quantities having substantially the phrase relationship of the generated voltages of said two lumped generating sources, a pair of electroresponsive devices each responsive to one of said instantaneous voltage quantities and each having two circuit controlling positions so as to provide more than two combinations of operating positions of said devices, and a control conditioning apparatus responsive to a predetermined sequence of different combinations of operating positions of said devices for controlling said circuit interrupting means, said control conditioning apparatus being arranged to be ineffective to cause operation of said circuit interrupting means until a predetermined minimum angular relationship between said plurality of instantaneous voltage quantities has obtained.

15. In a control arrangement for use with an electric system subject to asynchronous or out-of-step conditions thereon which may be represented by an equivalent system including a lumped generating source at each end thereof and having circuit interrupting means for subdividing said system at a predetermined point thereon, the combination of means for obtaining at said predetermined point on said system a plurality of instantaneous voltage quantities having substantially the phase relationship of the generated voltages of said two lumped generating sources, a pair of electroresponsive devices each responsive to one of said instantaneous voltage quantities and each having two circuit controlling positions so as to provide more than two combinations of operating positions of said devices, a control conditioning apparatus comprising a first relay responsive to a predetermined combination of operating positions of said devices, a second relay responsive to a different pre-determined combination of operating positions of said devices, and means responsive to the successive energization of said first and second relays to cause operation of said circuit interrupting means upon the occurrence of an out-of-step condition of said system.

16. In a control arrangement for use with an electric system subject to asynchronous or out-of-step conditions thereon which may be represented by an equivalent system including a lumped generating source at each end thereof and having circuit interrupting means for subdividing said system at a predetermined point thereon, the combination of means for obtaining at a predetermined point on said system a plurality of instantaneous voltage quantities having substantially the phase relationship of the generated voltages of said two lumped generating sources, a pair of electroresponsive devices each responsive to one of said instantaneous voltage quantities and each having two circuit controlling positions so as to provide more than two combinations of operating positions of said devices, a control conditioning apparatus comprising a first relay responsive to a predetermined combination of operating positions of said devices, a second relay responsive to a different pre-determined combination of operating positions of said devices, and means responsive to the successive energizaton of said first and second relays to cause operation of said circuit interrupting means upon the first pole slip of one of said synchronous machines relative to the other, said last mentioned means being arranged to prevent the operation of said circuit interrupting means unless a predetermined minimum angular relationship between said voltage quantities of said system obtains.

17. In a control arrangement for use with an electric system subject to asynchronous or out-of-step conditions thereon which may be represented by an equivalent system including a lumped generating source at each end thereof and having circuit interrupting means for subdividing said system at a predetermined point thereon, the combination of means for obtaining at said predetermined point a plurality of instantaneous voltage quantities having substantially the phase relationship of the generated voltages of said two lumped generating sources, a pair of electroresponsive devices each responsive to one of said instantaneous voltage quantities and each having two circuit controlling positions so as to provide more than two combinations of operating positions of said devices, a control conditioning apparatus responsive to a predetermined sequence of different combinations of operating positions of said devices for controlling said circuit interrupting means, and means for causing resetting of said control conditioning apparatus whenever a predetermined combination of operating positions of said devices obtains.

18. In a control arrangement for use on an alternating current system, subject to out-of-step conditions thereon comprising means for deriving from said system two voltages which have a frequency difference equal to the slip frequency of the system, and means responsive to the angular relationship of said voltages for producing a control impulse in response to the occurrence in a predetermined sequence of a plurality of different predetermined angular relationships of said voltages.

OLIVER C. TRAVER.
ELBERT H. BANCKER.